(12) United States Patent
Habarou et al.

(10) Patent No.: US 8,257,029 B2
(45) Date of Patent: Sep. 4, 2012

(54) TURBINE RING ASSEMBLY FOR GAS TURBINE

(75) Inventors: Georges Habarou, Le Bouscat (FR);
Julien Mateo, Le Pian Medoc (FR);
Eric Bouillon, Le Haillan (FR)

(73) Assignee: Snecma Propulsion Solide, Le Haillan (FR)

( * ) Notice: Subject to any disclaimer, the term of this patent is extended or adjusted under 35 U.S.C. 154(b) by 456 days.

(21) Appl. No.: 12/531,115

(22) PCT Filed: Mar. 14, 2008

(86) PCT No.: PCT/FR2008/050445
§ 371 (c)(1),
(2), (4) Date: Nov. 5, 2009

(87) PCT Pub. No.: WO2008/132364
PCT Pub. Date: Nov. 6, 2008

(65) Prior Publication Data
US 2010/0092281 A1      Apr. 15, 2010

(30) Foreign Application Priority Data
Mar. 15, 2007   (FR) ..................................... 07 53842

(51) Int. Cl.
*F01D 11/00* (2006.01)
(52) U.S. Cl. ..................................... 415/135; 415/170.1
(58) Field of Classification Search .................. 415/134, 415/135, 137, 138, 170.1, 174.3
See application file for complete search history.

(56) References Cited

U.S. PATENT DOCUMENTS

| 3,126,149 | A | | 3/1964 | Bowers, Jr. et al. |
| 4,589,666 | A | * | 5/1986 | Halling .......................... 277/631 |
| 5,088,775 | A | * | 2/1992 | Corsmeier et al. ............. 285/374 |
| 6,682,300 | B2 | * | 1/2004 | Bolms ......................... 415/173.3 |
| 7,771,160 | B2 | * | 8/2010 | Shi et al. ........................ 415/138 |
| 2005/0129499 | A1 | | 6/2005 | Morris et al. |
| 2006/0082074 | A1 | * | 4/2006 | Synnott et al. ................. 277/641 |
| 2010/0092281 | A1 | * | 4/2010 | Habarou et al. ............... 415/200 |
| 2010/0111678 | A1 | * | 5/2010 | Habarou et al. ............ 415/173.3 |
| 2010/0237571 | A1 | * | 9/2010 | Durocher et al. ............. 277/631 |

FOREIGN PATENT DOCUMENTS

| FR | 2559834 | 8/1985 |
| FR | 2724973 | 3/1996 |

* cited by examiner

*Primary Examiner* — Edward Look
*Assistant Examiner* — Christopher R Legendre
(74) *Attorney, Agent, or Firm* — Weingarten, Schurgin, Gagnebin & Lebovici LLP (57) ABSTRACT

A turbine ring assembly for a gas turbine includes a one-piece split ring (10) of ceramic matrix composite (CMC) material, a CMC wedge-shaped part (20) having flanks in contact with the ends of the ring, on either side of the split, so as to close the ring, and an annular metal support structure (40) surrounding the CMC ring and in contact therewith over the major fraction of its outline, the CMC ring being mounted with prestress in the metal structure, at least one element (26) exerting a resilient return force on the wedge-shaped part to keep it in contact with the ends of the CMC ring when the split opens under the effect of differential expansion between the annular metal structure and the CMC ring, and at least one element for preventing the CMC ring from turning about its axis.

16 Claims, 7 Drawing Sheets

TURBINE RING ASSEMBLY FOR GAS TURBINE

BACKGROUND OF THE INVENTION

The invention relates to turbine rings for gas turbines, whether industrial gas turbines or gas turbines forming aeroengines.

In a gas turbine, a turbine ring defines a flow section at a rotary wheel of the turbine for a stream of hot gas passing therethrough. In order to ensure the best possible efficiency, it is important to avoid gas passing directly between the tips of the blades of the turbine wheel and the inside surface of the ring. Thus, in the usual way, a turbine ring is provided on its inside face with a layer of abradable material with which the turbine tips can come into contact without significant damage under the effect of dimensional variations of thermal origin or as the result of the centrifugal force that is applied to the blades.

Turbine rings are usually made as a plurality of adjacent sectors of metal material.

For example, document U.S. Pat. No. 6,758,653 proposes replacing the metal material of the turbine ring sectors by a thermostructural composite material, and more particularly by a ceramic matrix composite (CMC) material. Such a material presents mechanical properties that make it suitable for constituting structural elements and also has the ability to conserve these properties at high temperature, while presenting density that is much lower than that of the metal materials commonly used in such an application.

It is therefore attractive to replace the metal material of the turbine ring sectors with a CMC material. Nevertheless, it is necessary to design an assembly for the ring sectors that is rather complex in order to accommodate the difference between the coefficients of expansion of a CMC material and of the material of a metal casing in which the ring sectors are assembled, and while minimizing leaks against adjacent sectors.

OBJECT AND SUMMARY OF THE INVENTION

An object of the invention is to provide a simplified CMC turbine ring assembly that also serves to minimize leaks of gas between a support structure of the ring and the flow section through a turbine wheel inside the ring.

This object is achieved by a turbine ring assembly for a gas turbine, the assembly comprising:

- a one-piece split ring of ceramic matrix composite (CMC) material;
- a wedge-shaped CMC part having flanks in contact with the ends of the ring on either side of the split, so as to close the ring;
- an annular metal support structure surrounding the CMC ring, in contact therewith over a major fraction of its outline, the CMC ring being mounted with prestress inside the metal structure;
- at least one element exerting a resilient return force on the wedge-shaped part to keep it in contact with the ends of the CMC ring when the split opens under the effect of differential expansion between the annular metal structure and the CMC ring; and
- at least one element for preventing the CMC ring from turning about its axis.

Thus, with a one-piece ring, the structure of the turbine ring assembly is simplified. In addition, using a CMC material makes it possible to reduce cooling requirements, thereby reducing the need for a stream of cooling air.

In a first embodiment the metal structure comprises two annular metal supports with the CMC ring being mounted between them.

The element exerting a resilient return force may be a prestressed elastically-deformable blade bearing firstly against the annular metal supports and secondly against the wedge-shaped part.

In a second embodiment, the metal structure comprises a metal hoop surrounding the outer peripheral surface of the CMC ring.

The element exerting a resilient return force may then be a prestressed elastically-deformable tongue integral with the metal hoop and bearing against the wedge-shaped part.

The metal structure may further comprise two annular metal supports with the CMC ring and the metal hoop being mounted between them, enabling differential expansion to take place at least in a radial direction between the metal hoop and the annular metal supports.

Advantageously, centering means are provided for centering the metal hoop and the CMC ring.

The metal hoop may be mounted between the annular metal supports by means of elastically-deformable blades.

Advantageously, a sealing gasket is interposed between at least one of the lateral faces of the CMC ring and a facing face of one of said annular metal supports.

In both embodiments, and preferably, the wedge-shaped part presents an inner end face that lies substantially in continuity with the inside peripheral surface of the CMC ring at the temperature to which the turbine ring assembly is normally exposed in operation.

The CMC ring may be provided with a layer of abradable material on its inside peripheral surface.

Advantageously, the material of the CMC ring is a self-healing ceramic matrix composite material.

The material of the CMC ring may be provided with a coating forming an environmental barrier for protection against corrosion.

Advantageously, the CMC ring includes fiber reinforcement made by three-dimensional weaving.

Also advantageously, the CMC ring and the wedge-shaped part are made out of the same material.

BRIEF DESCRIPTION OF THE DRAWINGS

The invention can be better understood on reading the following description made by way of non-limiting indication with reference to the accompanying drawings, in which.

DETAILED DESCRIPTION OF EMBODIMENTS

A first embodiment of the invention is described with reference to FIGS. 1 to 6.

Figure 1:
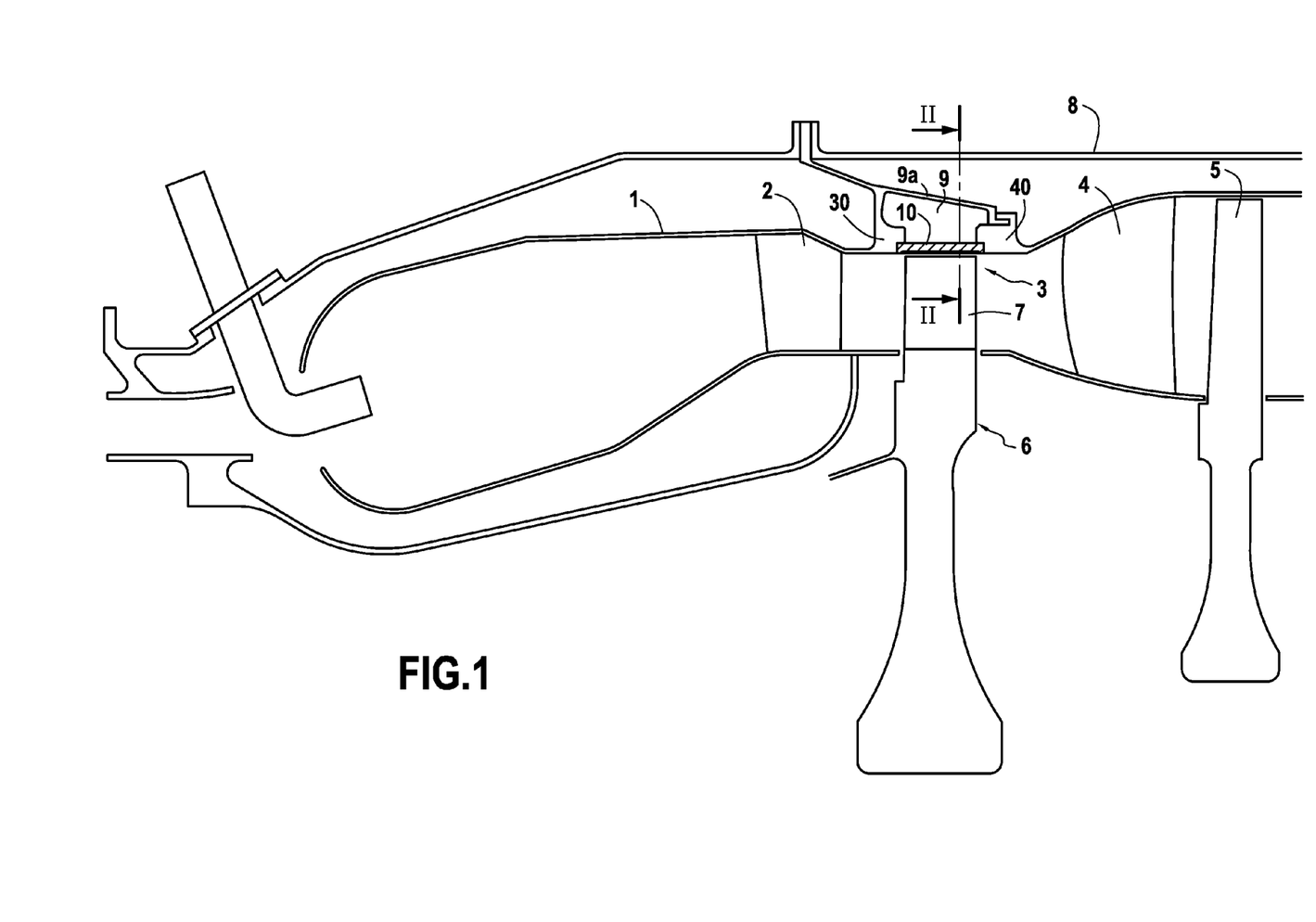
FIG. 1 is a highly diagrammatic fragmentary axial half-section view showing a first embodiment of a turbine ring assembly of the invention incorporated in its environment in a gas turbine.
Figure 2:
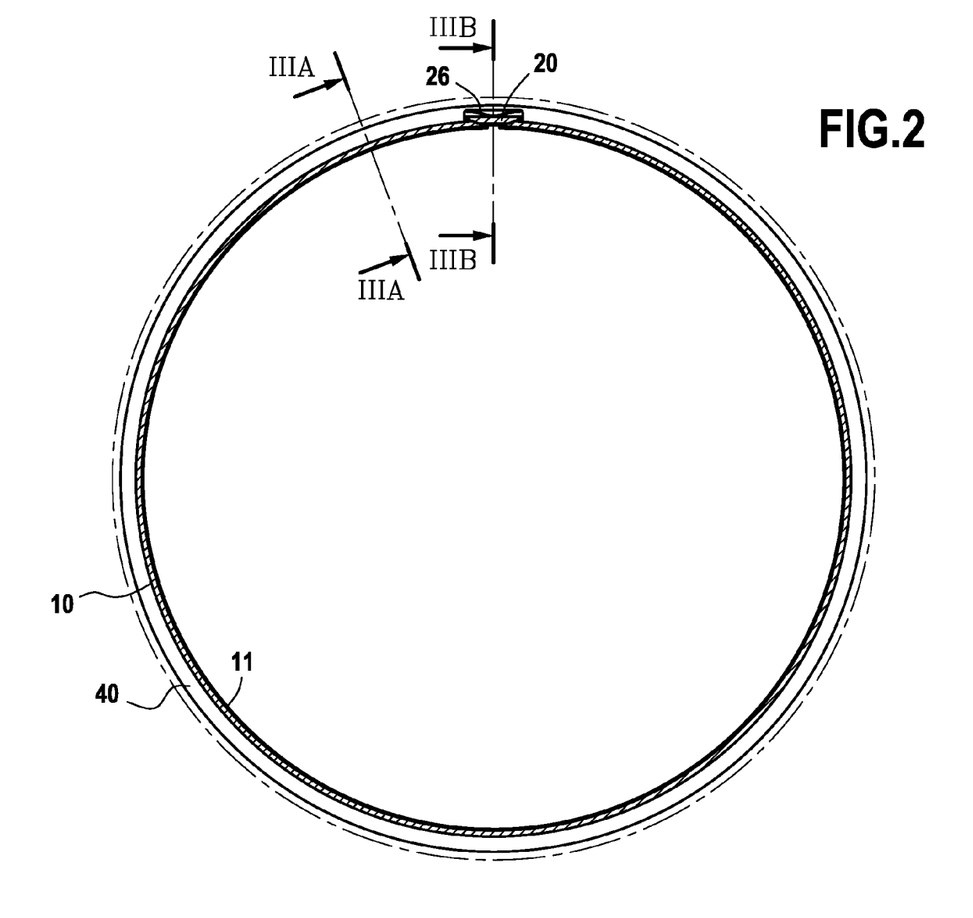
FIG. 2 is a fragmentary section view on plane II-II of FIG. 1.

FIG. 1 shows, in highly diagrammatic form, and on going from upstream to downstream in the flow direction of the gas stream through a gas turbine: a combustion chamber 1; a turbine nozzle 2 placed at the outlet from the combustion chamber; a high pressure (HP) turbine 3; a flow straightener 4; and a first stage of a low pressure (LP) turbine 5.

The HP turbine 3 comprises a turbine ring assembly and a wheel 6 movable in rotation and carrying blades 7.

The turbine ring assembly comprises a single-piece split turbine ring 10 made of CMC material. The CMC ring 10 is supported by a metal structure comprising upstream and downstream metal annular supports 30 and 40 with the ring 10 being placed between them.

The metal supports 30 and 40 are connected to a turbine casing 8. An annular space 9 is formed outside the ring 10, between the supports 30 and 40 and defined by a bottom wall 9a. Cooling air is fed to the annular space 9 in well-known manner.

Figure 3A:
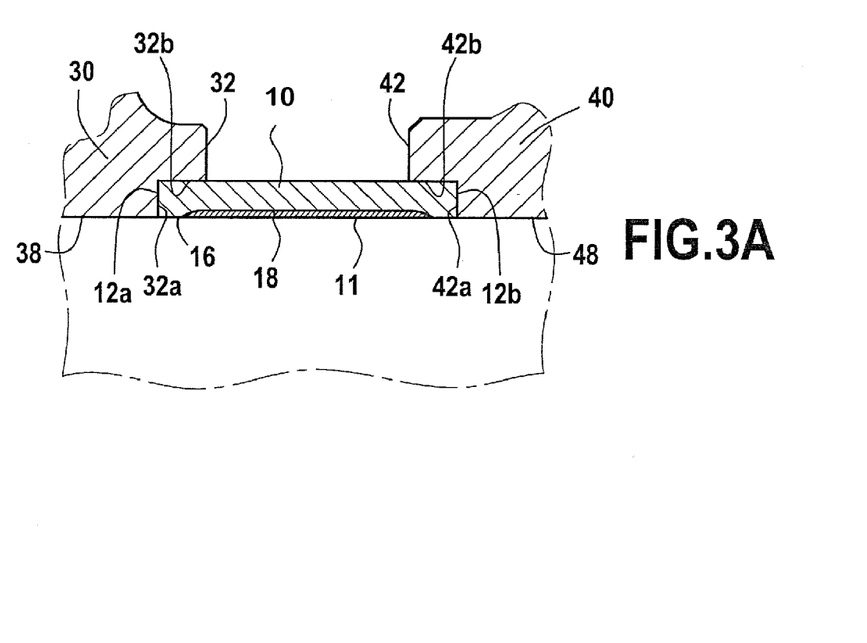
FIGS. 3A and 3B are fragmentary radial section views on a larger scale showing the turbine ring assembly on planes IIIA-IIIA and IIIB-IIIB of FIG. 2.
Figure 3B:
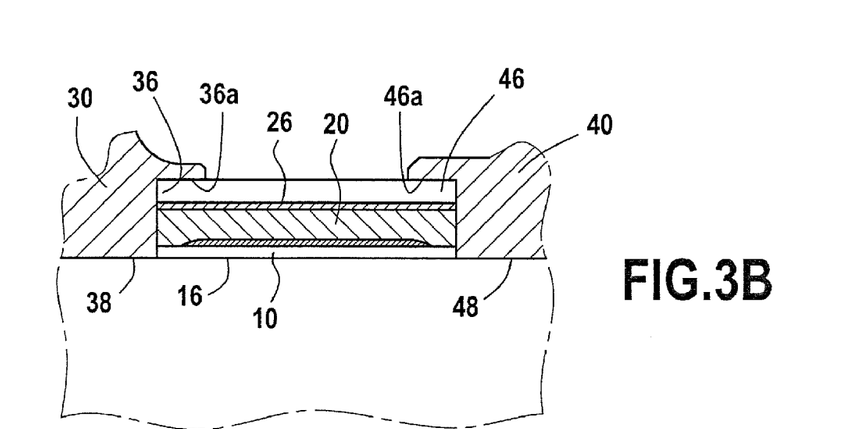

As shown in greater detail in FIGS. 3A and 3B, lateral portions of the ring 10 adjacent to its opposite lateral faces 12a and 12b engage in cylindrical housings formed by steps in the inner faces 32 and 42 of the supports 30 and 40 that are situated facing the ring 10.

In its lateral portions, the ring 10 has its lateral faces 12a and 12b adjacent to the end walls 32a and 42a of said housings, and it presses via its outer peripheral surface against the peripheral cylindrical walls 32b and 42b of the same housings (FIG. 3A). The split ring 10 is inserted with circumferential prestress in the housings of the supports 30 and 40 within the limit of its capacity for elastic deformation so that, as explained below, contact with pressure between the ring 10 and the cylindrical walls 32b and 42b continues to be maintained in the event of the supports 30 and 40 expanding for thermal reasons, given that the metal material from which they are made has a coefficient of expansion that is greater than that of the CMC material of the ring 10.

Figure 5A:
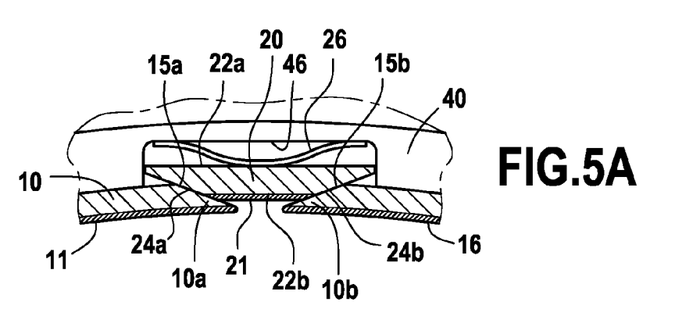
FIGS. 5A and 5B show a detail in section of FIG. 2, on a larger scale, respectively when the turbine ring assembly is cold, and when it is at high temperature under conditions of use.
Figure 5B:
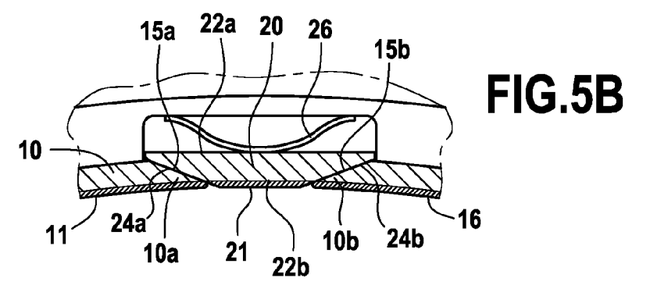
Figure 6:
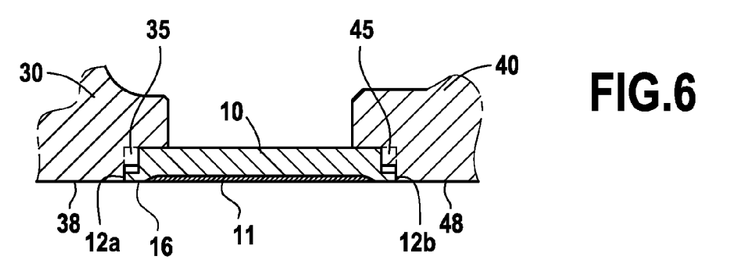
FIG. 6 is a fragmentary view on a larger scale showing a detail of the turbine ring assembly of FIGS. 1 and 2.

When cold, the ring 10 is almost closed, with the gap between its ends being small. The ring 10 has its end portions 10a and 10b chamfered, and a wedge-shaped closure part 20 is pressed against the chamfered surfaces 15a and 15b of the end portions of the ring 10 (FIGS. 5A, 5B). The section of the part 20 is substantially trapezoidal, with a rear face 22a and a shorter front face 22b that is connected to the rear face 22a via inclined side faces 24a and 24b that press against the chamfered surfaces 15a and 15b and that have substantially the same angles of inclination as they do. The part 20 is made of CMC material, preferably out of the same material as the ring 10, and is of a width that is substantially equal to the width of the ring 10.

Figure 4:
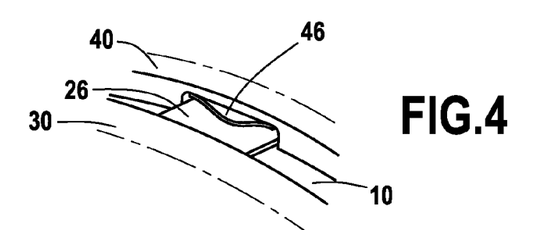
FIG. 4 is a fragmentary perspective view on a larger scale showing a detail of the turbine ring assembly of FIGS. 1 and 2.

The part 20 is pressed against the chamfered end portions of the ring 10 with a resilient bearing force that is exerted by an elastically-deformable blade 26 that is received in a prestressed state between the rear face 22a of the part 20 and end walls 36a and 46a of housings 36 and 46 formed over a sector of each of the annular supports 30 and 40, starting from their inner faces 32 and 42 (FIGS. 3B and 4). In the example shown, the blade 26 has a curved shape with its central portion pressing against the part 20 and with its end portions pressing against the walls 36a and 46a. The front face 22b of the part 20 has a circular profile of radius substantially equal to that of the inside peripheral surface 16 of the ring 10.

FIGS. 5A and 5B show the relative positions of the ring 10 and of the part 20 respectively when cold and when hot, i.e. once the operating temperature has been reached while the gas turbine in which the turbine ring assembly is mounted is operating under normal conditions. When cold, the part 20 is set back from the inside surface 16 of the ring 10. When hot, the split in the ring 10 enlarges as a result of the ring 10 that was assembled with pre-stress "follows" the expansion of the metal annular supports 30 and 40. The dimensions of the part 20 are selected as a function of the differential expansion between the ring 10 and the supports 30 and 40, so that when hot the front face 22b of the part 20 is situated substantially in continuity with the inside surface 16 of the ring 10, the flexible blade 26 continuing to apply a pressure force on the part 20.

The continuous pressing with prestress between the outside surface of the ring 10 and the surfaces 32b and 42b ensures that the ring 10 is centered. This continuous pressing also serves to limit leaks between the outside of the ring 10 and the hot gas flow section inside the ring 10. When the turbine ring assembly is cooled in operation by feeding air to the outside of the turbine ring, leaks of cooling air into the hot gas flow section could be minimized even further, if so desired, by placing an annular sealing gasket between the ring 10 and the downstream annular support 40.

On its inside peripheral surface, the ring 10 is provided with a layer 11 of abradable material with which the tips of the blades of a rotary wheel surrounded by the ring 10 can come into contact without significant damage. In the example shown, the layer 11 is placed in an annular setback 18 formed in the inside surface 16 over a major fraction of the width of the ring 10 in the axial direction. As a result, the exposed face of the layer 11, the portions of the inside surface 16 situated on either side thereof, and the inside peripheral surfaces 38 and 48 of the annular metal supports 30 and 40 define a continuous surface for the hot gas flow section, which surface does not present any sudden variation in diameter. It is nevertheless possible to envisage forming the layer of abradable material 11 as an extra thickness on the inside surface 16 of the ring 10. A layer 21 of abradable material is advantageously formed on the front face 22b of the part 20 so that, when hot, it comes into continuity with the layer 11.

The ring 10 is prevented from turning relative to the annular supports 30 and 40, or at least relative to one of them. This ensures that contact between a blade tip of the rotary wheel and the abradable coating 11 does not cause the ring to turn. By way of example, turning may be prevented by means of teeth 35 and 45 (FIG. 6) projecting from the walls 32 and 42 and engaging in notches formed in the lateral faces 12a and 12b of the ring 10.

A second embodiment of the turbine ring assembly of the invention is described below with reference to FIGS. 7 to 14.

Figure 7:
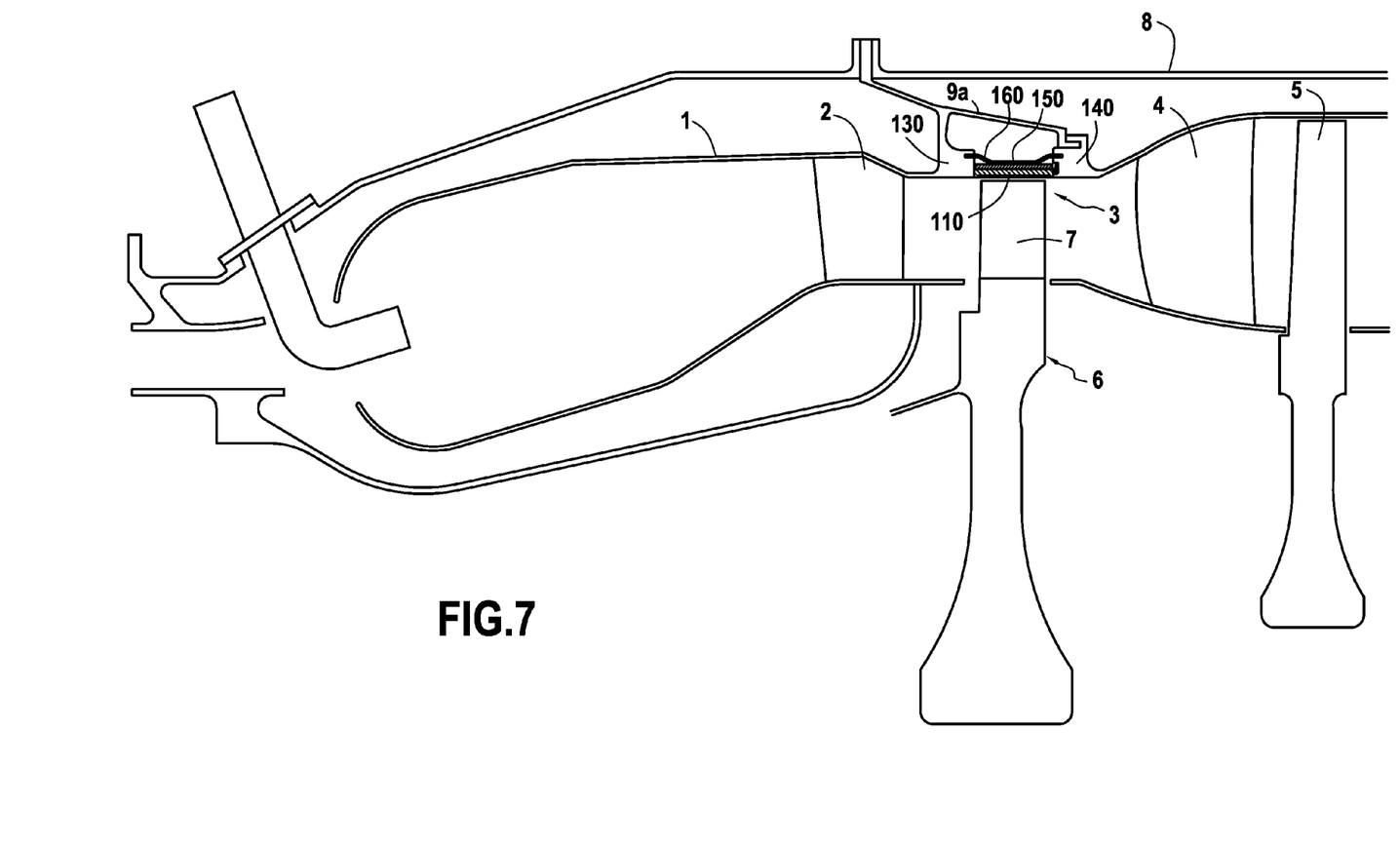
FIG. 7 is a highly diagrammatic fragmentary view in axial half-section showing how a second embodiment of a turbine ring assembly of the invention is incorporated in its environment in a gas turbine.

FIG. 7 is a fragmentary diagrammatic view in axial half-section of a gas turbine that differs from FIG. 1 essentially by the way in which the CMC split turbine ring 110 is mounted between the annular metal supports 130 and 140, the other elements of the gas turbine being similar to those of FIG. 1 and having the same references.

Figure 8:
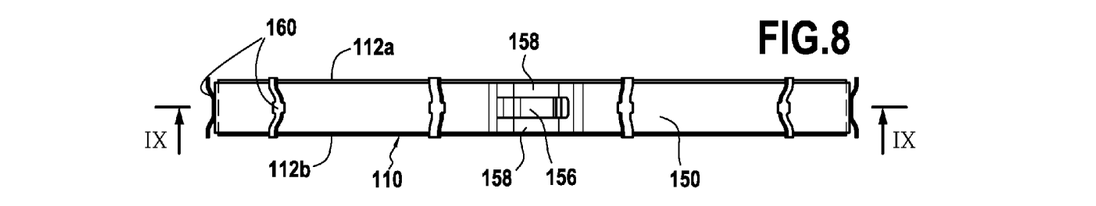
FIG. 8 is a lateral elevation view of a CMC ring and a metal hoop in the second embodiment of the invention.
Figure 12:
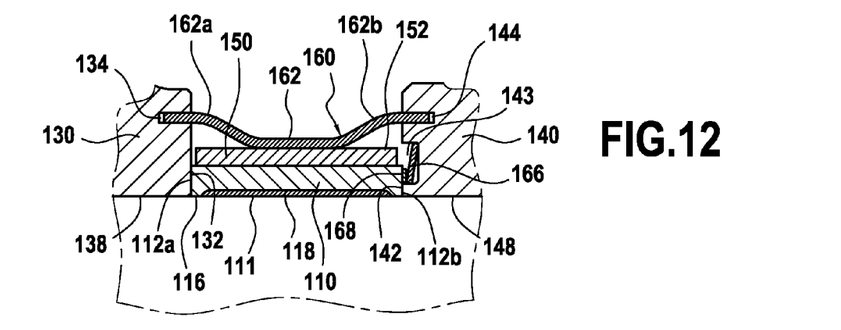
FIGS. 12 and 13 are fragmentary radial section views on a larger scale showing details of the turbine ring assembly of FIGS. 8 and 9.

The split ring 110 is mounted with circumferential pre-stress inside a metal hoop 150, within the limit of its capacity for elastic deformation. Mounting is performed so that contact with pressure between the outside peripheral surface of the ring 110 and the inside surface of the hoop 150 continues to be maintained in the event of differential expansion of thermal origin at the temperatures encountered in operation by the turbine ring assembly, the metal material of the hoop 150 having a coefficient of expansion that is greater than that of the CMC material of the ring 110. The hoop 150 is of a width that is slightly less than the width of the ring 110, with its lateral edges being set back from the lateral faces 112a and 112b of the ring 110 (FIGS. 8 and 12).

Figure 9:
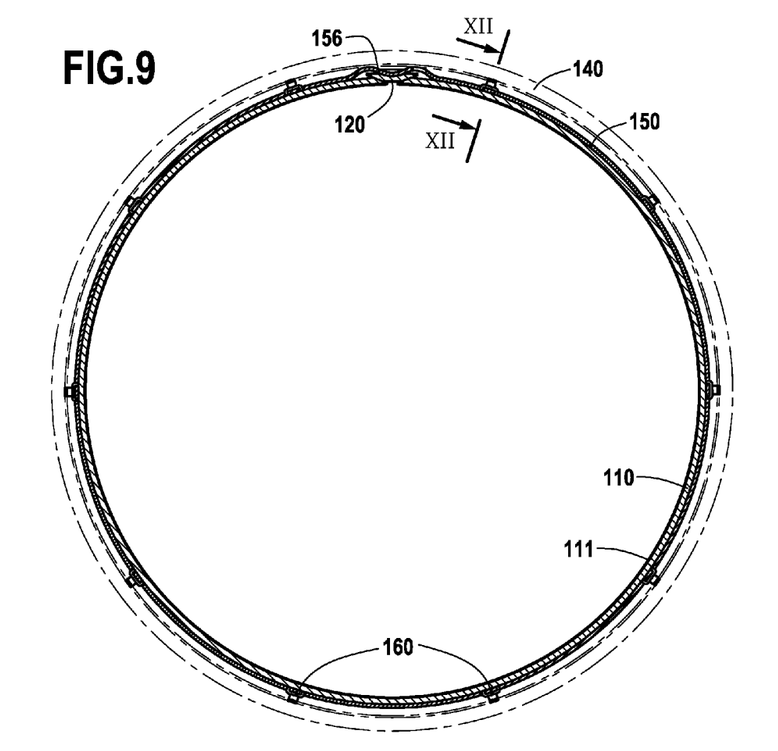
FIG. 9 is a section view on plane IX-IX of FIG. 8.
Figure 10:
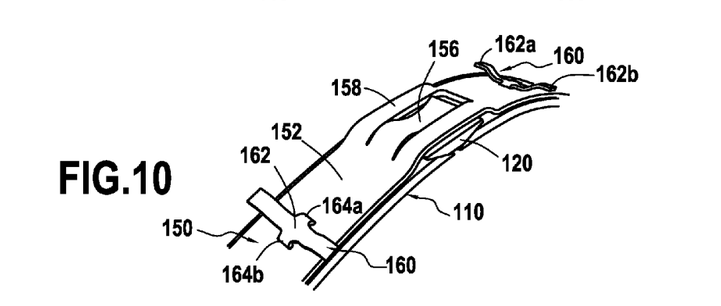
FIG. 10 is a fragmentary perspective view on a larger scale showing the CMC ring and the metal hoop surrounding the ring in the second embodiment of FIGS. 7 to 9.
Figure 11:
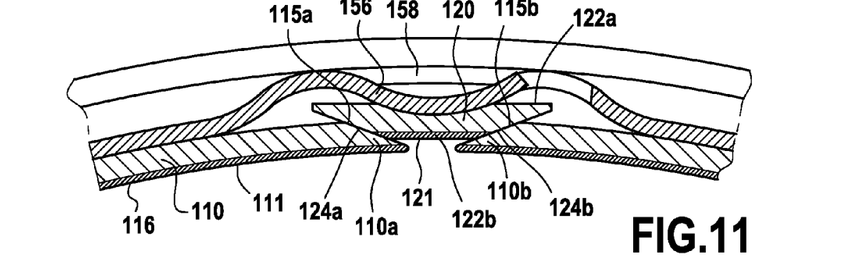
FIG. 11 shows a detail on a larger scale of the section view of FIG. 9.

When cold, the ring 110 is almost closed, and the gap between its ends is small. The ring 110 has its end portions 110a and 110b chamfered and a closure part 120 in the form of a wedge is pressed against the chamfered surfaces 115a and 115b of the end portions of the ring (FIGS. 9, 10, and 11). The part 120 is similar to part 20 of the above-described embodiment. It presents a rear face 122a, a front face 122b of curvature substantially equal to that of the inside peripheral surface 116 of the ring 110, and lateral faces 124a and 124b that press against the chamfered surfaces 115a and 115b. The part 120 is made of CMC material, preferably of the same material as the ring 110 and is of a width that is substantially equal to the width of the ring 110.

The part 120 is pressed against the chamfered end portions of the ring 110 with a resilient pressure force exerted by an elastically-deformable tongue 156. As shown in FIGS. 10 and 11, the hoop 150 is spaced apart from the ring over a larger-diameter portion 158 that is connected to the remainder of the hoop, thereby leaving a gap for the part 120 in the vicinity of the end portions of the ring 110, which ring remains pressed against the inside surface of the hoop 150 over the major fraction of its outline. In the example shown, the tongue 156 is cut in the circumferential direction in the middle zone of the portion 158 of the hoop 150 and remains connected thereto at one end. After being cut, the tongue is deformed so as to be curved and pressed against the part 120, exerting a resilient force thereagainst, including when the hot part 120 closes the split in the ring 110 with its front face 122b being substantially in continuity with the inside surface 116 of the ring 110. Naturally, it is possible to use other shapes for the elastically-deformable parts that exert a pressure force on the part 120, e.g. a blade similar to that in the above-described embodiment.

The ring 110 together with the hoop 150 is placed between the metal annular supports 130 and 140, the lateral faces 112a and 112b of the ring being adjacent to the inner lateral faces 132 and 142 of the supports 130 and 140 that are situated facing the ring 110.

The ring 110 provided with the hoop 150 is held between the supports 130 and 140 by means of elastically-deformable metal blades 160 (FIGS. 8, 10, and 12) that extend radially. A plurality of blades 160 are provided that are preferably distributed regularly around the axis of the ring 110, there being at least three such blades. Each blade 160 has a central portion 162 connected to the outside surface 152 of the hoop 150 that is connected to curved lateral portions 162a and 162b extending away from the surface 152. The ends of the lateral portions 162a and 162b are engaged in corresponding recesses 134 and 144 formed in the faces 132 and 142 of the supports 130 and 140. The blades 160 are connected to the outside surface 152 of the hoop 150, e.g. by clip-fastening, welding, or riveting. In the example shown, the blades 160 are provided with hooks 164a and 164b on either side of their central portions 162, which hooks are engaged with elastic deformation in housings formed in the outside surface 152 of the hoop 150 (FIG. 10).

Figure 13:
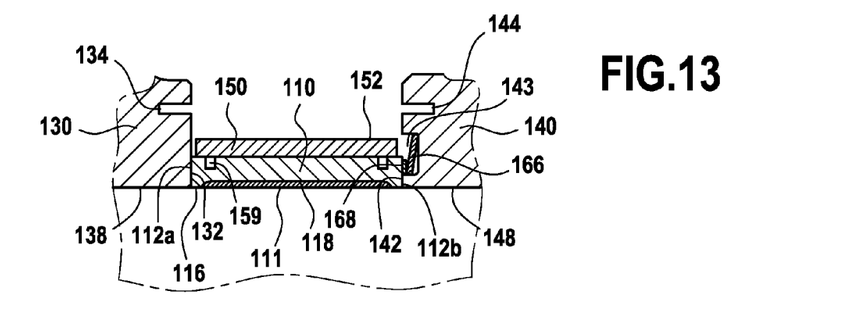

The blades 160 enable the desired centering of the ring 110 to be conserved inside the hoop 150 while still allowing differential expansion to take place in a radial direction between the hoop 150 and the annular supports 130 and 140. As mentioned above, for the above-described embodiment, it can be desirable to minimize or control leaks between the outside of the ring 110 and the hot gas flow section inside the ring 110, at least beside the downstream annular support 140. For this purpose, a resilient washer 166 is placed in a groove 143 formed in the inner surface 142 of the annular support 140 (FIGS. 12 and 13). The resilient washer is prestressed and has its circumferentially outer end pressing against the bottom of the groove 143 and its circumferentially-inner end pressing against a thrust washer 168 pressed against the lateral face 112b of the ring 110. In a variant, a sealing gasket with an ω-shaped profile could be used.

Holes may be formed through the elastic washer 166 in order to balance pressure in the groove 143 on either side of the washer 166 and allow a flow of cooling air to pass for the annular support 140.

On its inside periphery, the ring 110 is provided with a layer 111 of abradable material. As in the above-described embodiment, the layer 111 is received in an annular setback 118 formed in the inside surface 116 of the ring 110 so as to co-operate with the inside peripheral surfaces 138 and 148 of the annular metal supports 130 and 140 to form a continuous surface for the hot gas flow section without any sudden change in diameter. A similar abradable coating 121 is formed on the front face 122b of the part 120. Naturally, it is possible to envisage forming a coating 111 that projects from the inside surface 116 of the ring 110.

As in the above-described embodiment, the ring 110 with the hoop 150 is prevented from turning relative to the supports 130 and 140, or relative to at least one of them. This is achieved, for example, by means of pegs 159 (FIG. 13) that are secured to the hoop 150 and that engage in blind holes formed in the outside face of the ring 110. The hoop 150 is prevented from turning relative to the supports 130 and 140 by means of the blades 160 having their ends engaged in the recesses 134 and 144 in the faces 132 and 142. In a variant, the recesses 134 and 144 could be in the form of continuous grooves, in which case the hoop 150 would be prevented from turning relative to the supports 130 and 140 by other means, e.g. by forming one or more teeth on at least one of the faces 132 and 142, each of said teeth engaging in a notch formed in the hoop 150 and optionally in the ring 110.

The CMC material of the ring 10 or 110 and of the part 20 or 120 may be of known type obtained by densifying a fiber preform with a ceramic matrix, the fiber preform providing the fiber reinforcement of the material. The fibers of the preform are refractory fibers such as carbon fibers or ceramic fibers, e.g. fibers of silicon carbide (SiC). It should be observed that the term "ceramic" also covers compounds of the refractory oxide type.

A first step may consist in making a fiber preform that serves, after densification by the ceramic matrix, to obtain a part from which the ring 10 or 110 or the wedge-shaped part 20 or 120 can be machined or cut out. It should be observed that machining is preferably performed at an intermediate stage of densification so as to ensure that after a subsequent final stage of densification the fibers of the fiber preform are well protected by a layer of matrix.

Figure 14:
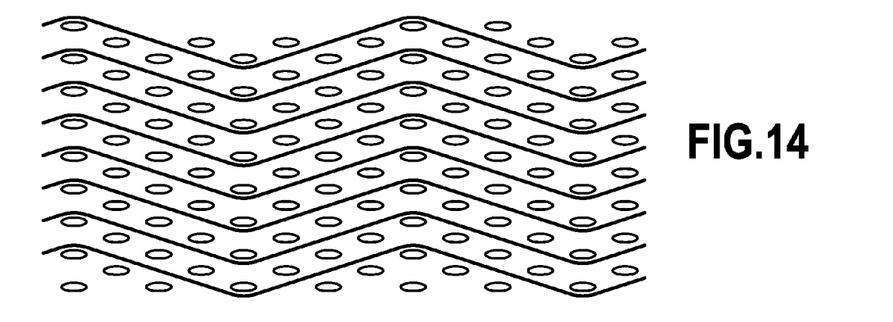
FIG. 14 shows an example of an interlock type weave for three-dimensionally weaving fiber reinforcement for a CMC ring for a turbine ring assembly of the invention.

One way of making a fiber preform for the ring 10 or 110 consists in making a strip of desired thickness by three-dimensional weaving. FIG. 14 is a diagram showing an interlock type weave suitable for three-dimensional weaving (the weft yarns being shown in section). The end portions of the woven strip may be made with decreasing thickness corresponding to the chamfered ends of the ring. The decreasing thickness may be obtained during weaving by progressively reducing the number of layers of warp and weft yarns. Three-dimensional weaves other than interlock weaves can be used, such as multilayer weaves, e.g. of the multi-plain or multi-satin type, as described in document WO 2006/136755.

Other ways of making a fiber preform for the ring 10 or 110 can be envisaged. For example, it is possible to form a strip of desired thickness by superposing a plurality of fiber plies, e.g. strips of woven fabric with the strips being bonded together, e.g. by needling.

The ceramic matrix may be a refractory ceramic matrix such as SiC, or advantageously it may be a "self-healing" ceramic matrix. A "self-healing" ceramic matrix is obtained by making at least one of the component phases of the matrix out of a material that, by passing to the viscous state in a certain temperature range, is capable of filling in or "healing" cracks that form in the matrix, in particular under the effect of thermal cycling. Compositions having "self-healing" properties are in particular vitreous compositions, e.g. of the aluminosilicate type, or compositions that, under the effect of oxidation, are capable of forming vitreous compositions. Matrix phases of boron carbide $B_4C$ or of an Si—B—C ternary system are precursors of vitreous compositions. The matrix may be formed by chemical vapor infiltration (CVI) and an interphase coating, e.g. of pyrolytic carbon (PyC) or of boron nitride BN may previously be formed on the fibers of the preform. The fiber preform may be kept in the desired shape during an initial stage of densification until the preform is consolidated, i.e. until it has been partially densified to an extent that is sufficient to enable the preform thereafter to conserve its shape without the help of tooling. Methods of making a composite material with a self-healing ceramic matrix are described in particular in documents U.S. Pat. Nos. 5,965,266, 6,291,058, and 6,068,930.

After densification and machining, the CMC material may be protected against corrosion by an environmental protection barrier, in known manner. Such a barrier may for example comprise an outer layer of yttrium-stabilized zirconia and a bonding underlayer of mullite. It is also known to provide corrosion resistance by means of a layer made of a compound of the type comprising an aluminosilicate of an alkaline earth metal, such as the compound $BaO_{0.75}SrO_{0.25}Al_2O_3(SiO_2)_2$ commonly known by the abbreviation BSAS. With a CMC material that contains silicon, a chemical barrier layer may then be interposed, e.g. a layer of mullite or comprising a mixture of mullite plus BSAS, while a bonding or keying underlayer of Si may be provided. A thermal barrier layer of yttrium-stabilized zirconia may be formed on the BSAS layer. Environmental barriers that are particularly suitable for CMC materials having a matrix containing silicon are described in particular in the following documents: U.S. Pat. No. 6,866,897, EP 1 416 066, U.S. Pat. No. 6,759,151, FR 06/51880, and FR 06/55578. The various layers of the environmental barrier may be deposited by physical vapor deposition, e.g. by plasma or thermal plasma sputtering, or by chemical vapor deposition (CVD), possibly with the assistance of a plasma.

The layer of abradable material is for example made of a refractory oxide such as zirconia or alumina. It may be formed by physical vapor deposition, e.g. by plasma or thermal plasma sputtering. The abradable material is preferably porous. In known manner, its porosity may be controlled by depositing the material of the abradable layer together with a powder of material that can be eliminated at high temperature, e.g. polyethylene powder.

The layer of abradable material may be formed on the environmental protection barrier.

The wedge-shaped part 20 or 120 with the layer of abradable material 21 or 121 can be obtained in a manner similar to that described for the ring 10 or 110. To make its fiber preform, it is nevertheless possible to form a strip of fiber texture of desired thickness by three-dimensional weaving or by superposing and bonding together fiber plies, and then cutting said strip up into preforms having shapes that correspond to the shapes desired for the parts 20 or 120.

The turbine ring assembly of the invention is particularly suitable for an HP turbine of a gas turbine. Nevertheless, it can also be used for an LP turbine, or indeed for an intermediate turbine if a gas turbine has more than two stages.

The invention claimed is:

1. A turbine ring assembly for a gas turbine, the assembly comprising:
a one-piece split ring of ceramic matrix composite (CMC) material;
a wedge-shaped CMC part having flanks in contact with the ends of the ring on either side of the split, so as to close the ring;
an annular metal support structure surrounding the CMC ring, in contact therewith over a major fraction of its outline, the CMC ring being mounted with prestress inside the metal structure;
at least one element exerting a resilient return force on the wedge-shaped part to keep it in contact with the ends of the CMC ring when the split opens under the effect of differential expansion between the annular metal structure and the CMC ring; and
at least one element for preventing the CMC ring from turning about its axis.

2. A turbine ring assembly according to claim 1, wherein the metal structure comprises two annular metal supports with the CMC ring being mounted between them.

3. A turbine ring assembly according to claim 2 wherein the element exerting a resilient return force is a prestressed elastically-deformable blade bearing firstly against the annular metal supports and secondly against the wedge-shaped part.

4. A turbine ring assembly according to claim 1, wherein the metal structure comprises a metal hoop surrounding the outer peripheral surface of the CMC ring.

5. A turbine ring assembly according to claim 4, wherein the element exerting a resilient return force is a prestressed elastically-deformable tongue integral with the metal hoop and bearing against the wedge-shaped part.

6. A turbine ring assembly according to claim 4, wherein the metal structure further comprises two annular metal supports with the CMC ring and the metal hoop being mounted between them, enabling differential expansion to take place at least in a radial direction between the metal hoop and the annular metal supports.

7. A turbine ring assembly according to claim 6, further including means for centering the metal hoop and the CMC ring.

8. A turbine ring assembly according to claim 6, wherein the metal hoop is mounted between the annular metal supports by means of elastically-deformable blades.

9. A turbine ring assembly according to claim 6 wherein a sealing gasket is interposed between at least one of the lateral faces of the CMC ring and a facing face of one of said annular metal supports.

10. A turbine ring assembly according to claim 1, wherein the wedge-shaped part presents an inner end face that lies substantially in continuity with the inside peripheral surface of the CMC ring at the temperature to which the turbine ring assembly is normally exposed in operation.

11. A turbine ring assembly according to claim 1, further including a layer of abradable material on the inside peripheral surface of the CMC ring.

12. A turbine ring assembly according to claim 1, wherein the material of the CMC ring is a self-healing ceramic matrix composite material.

13. A turbine ring assembly according to claim 1, wherein the material of the CMC ring is provided with a coating forming an environmental barrier for protection against corrosion.

14. A turbine ring assembly according to claim 1, wherein the CMC ring includes fiber reinforcement made by three-dimensional weaving.

15. A turbine ring assembly according to claim 1, wherein the CMC ring and the wedge-shaped part are made out of the same material.

16. A gas turbine including a turbine ring assembly according to claim 1.

* * * * *